(No Model.)
W. T. JOHNSTONE.
FERTILIZER DISTRIBUTER.
No. 600,079. Patented Mar. 1, 1898.
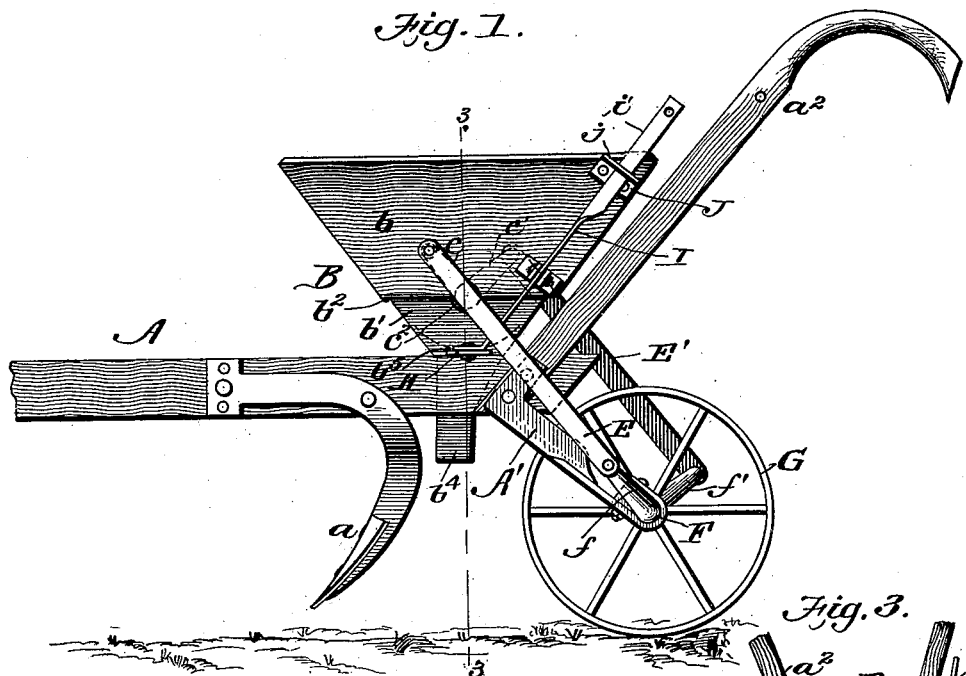
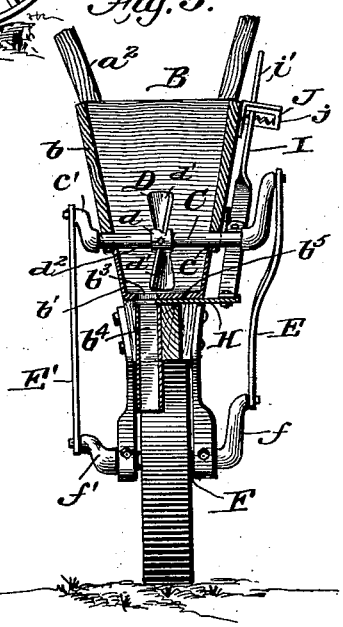
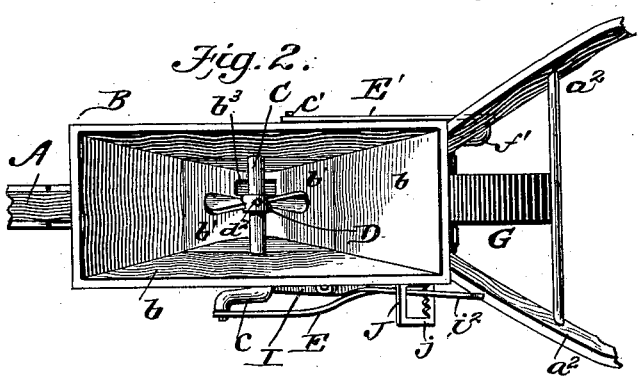
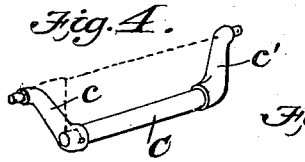
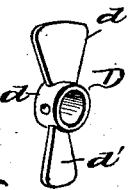
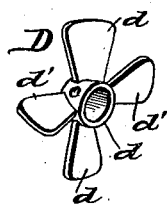
WITNESSES:
INVENTOR
W. T. Johnstone.
BY Munn & Co.
ATTORNEYS.

UNITED STATES PATENT OFFICE.

WALTER TERRELL JOHNSTONE, OF MACON, GEORGIA.

FERTILIZER-DISTRIBUTER.

SPECIFICATION forming part of Letters Patent No. 600,079, dated March 1, 1898.

Application filed March 15, 1897. Serial No. 627,530. (No model.)

*To all whom it may concern:*

Be it known that I, WALTER TERRELL JOHNSTONE, of Macon, in the county of Bibb and State of Georgia, have invented a new and useful Improvement in Fertilizer-Distributers, of which the following is a specification.

My invention is an improvement in fertilizer-distributers, and has for its object to provide a machine which will evenly and accurately distribute the guano or other fertilizing material upon the soil when the machine is in operation.

A further object of my invention is to provide a new agitating device which will, when the machine is in motion, perturb the fertilizing material in such a manner that the fertilizer will be accurately and evenly distributed at all times.

Heretofore the agitators generally used have been found objectionable, for should the machine be given a sudden start the blades of the agitator will be thrown into operation so quickly that they will throw and scatter the guano or other fertilizer in all directions, thus causing a great waste. In my invention I have provided against this defect by making the agitator in the form of propulsion-blades and have found by the use of such blades that the fertilizer will be so thoroughly agitated and in such a pulverized condition that the material will readily fall through the opening in the bottom of the hopper into the chute and to the ground in a loose or separated condition.

My invention further consists in the novel construction and arrangements of parts, as will be hereinafter more fully described and claimed.

In the drawings, Figure 1 is a side elevation of my improved fertilizer-distributing machine. Fig. 2 is a plan view of the same. Fig. 3 is a cross-section on the line 3 3 of Fig. 1. Fig. 4 is a detail view of one of the crank-shafts; and Figs. 5 and 6 are detail views, hereinafter referred to.

The frame of my machine is preferably of the construction now in use, which consists of a draft-beam A, having attached to the forward end thereof an adjustable furrow-opener $a$, and to the rear end are secured the handles $a^2$, by which the machine is guided by the operator. Suitably mounted upon the rear of the beam A is a hopper B, which is made of an upper wooden section $b$ and a lower cast-iron section $b'$. This lower section is made in the form of a flaring box, the upper portion being larger than the bottom and having a flange $b^2$, to which is bolted or otherwise secured the lower end of the wooden section $b$. In the bottom of the lower or cast-iron section of the hopper is an opening $b^3$, through which the guano or other fertilizing material passes. To the under side of the hopper is secured a chute $b^4$, which communicates with the opening $b^3$ and forms a passage for the guano from the hopper to the ground.

By making the hopper in sections I am enabled not only to make the machine lighter, but provide a firmer bearing for the agitator-shaft. This shaft C is mounted in the lower section $b$ of the hopper in suitable cut-out sockets or bearing portions $c^2$. Securely held upon the agitator-shaft C is the stirrer or agitating-wheel D, which consists of a hub portion $d$, having two or more laterally-projecting stirrer-blades $d'$ $d'$. These blades are made wider at the periphery than at the base and are turned at an angle to the line of the shaft, thus giving a broader surface to agitate the guano than the ones now generally used. It will be readily understood that during the revolution of the blades the edge will first come in contact with the material and then, through a further revolution, the broad side will gradually come in contact and push the material from one side to the other, thus giving an easy but thorough agitation to the fertilizer. The wheels are held upon the shaft in any location by a set-screw $d^2$, which passes through the hub and engages the shaft C.

The shaft C, before referred to, is made in the form of a double-crank shaft, the ends $c$ and $c'$ being turned up at right angles to the body of the shaft and at an angle of about forty-five degrees in advance of each other. To the outer ends of these crank-arms are suitably connected the ends of two pitmen-rods E and E', to the opposite ends of which are connected the crank-arms $f$ and $f'$ of the drive-shaft F. These crank-arms $f$ and $f'$ are arranged in advance of each other similar to the arms $c$ and $c'$. Upon the rear of the beam A is fastened two rearwardly-extending brackets or arms A', in which is journaled the drive crank-shaft F, upon which is keyed a suitable drive-wheel G. It will be readily seen that by arranging one crank-arm of the shafts C and F, respectively, in advance of the other the possibility of reaching a dead-center is at all times avoided. This is an important feature of my invention, as it enables the operator to stop the machine at any time without the fear of the wheels being locked and the machine being inoperative through the cranks of the two shafts being in direct line and causing a dead-center.

When it is desired to transport the machine from place to place without distributing the fertilizer, I have provided a suitable cut-off slide H, operating in a cut-out portion $b^5$ in the lower section of the hopper and working directly over the opening $b^3$. This slide H is operated by a spring-lever I, pivoted upon the side of the hopper, one end of the lever being connected to the said slide H and the opposite end terminating in a handle portion $i'$. In order to hold the lever in any desired position, I provide a bracket J, securely held upon the side of the hopper and having a portion $j$ extending at right angles therefrom. This outwardly-extending portion $j$ is cut out, providing a loop, as it were, through which the lever I is passed. On the inner face of one of the cut-out portions I provide notches or teeth by which the lever is locked in any desired position.

By the construction above described the slide can be pushed in, entirely closing the opening in the hopper, or can be adjusted to only partially close the same, thereby limiting the amount of fertilizer to be distributed. The lever I is made of flat spring metal, the outer portion of which is turned at right angles to the body of the lever to form a handle. The body of the lever being flat and pivoted upon a flat surface forms a spring which forces the outer portion against the bracket and holds the lever to any adjusted position.

As a modified form of agitators I may make the stirrer-wheel with four blades instead of two. I do not wish, however, to limit myself to any number of blades, as any number will be used that may be found practicable.

By referring to Fig. 6 of the drawings it will be seen that when the four-blade wheel is to be used I prefer to arrange two of the blades at right angles and two at left angles to the line of the shaft. In other words, I turn one blade at an angle from right to left and the next blade from left to right, and so on.

It will be understood that by making the wheel in the manner described and shown during the revolution of the wheel one blade will push the guano or other material over the discharge-opening in the hopper and the next blade will push the guano in the opposite direction to that of the preceding blade, thus insuring an even and positive feed. From the foregoing the advantages of my fertilizer may be readily understood.

Having thus described my invention, what I claim as new, and desire to secure by Letters Patent, is—

1. An implement substantially as described, comprising a hopper, a shaft mounted in said hopper, an agitator-wheel mounted upon said shaft, said wheel provided with blades inclined to its shaft, the alternate blades being inclined in opposite directions substantially as shown and described.

2. In an implement substantially as described, the combination of a rack, and a lever formed of a flat bar twisted between its ends to form sections lying approximately at right angles to each other, having one section engaged with the rack, and the other section pivoted and adapted to operate with a tension to press the other section in such engagement, substantially as shown and described.

3. In an implement substantially as described, comprising a hopper, an opening in said hopper, a shaft mounted in said hopper, an agitator-wheel mounted upon said shaft, and having its blades alternately inclined whereby to push the fertilizer first from one side over the opening, and then from the other side, a slide and a spring-lever for operating said slide substantially as shown and described.

WALTER TERRELL JOHNSTONE.

Witnesses:
C. W. JOHNSON,
B. E. WILLINGHAM.